US012663544B2

(12) United States Patent
Smith et al.

(10) Patent No.: US 12,663,544 B2
(45) Date of Patent: Jun. 23, 2026

(54) OCEAN SOUND SPEED PROFILING LIDAR

(71) Applicant: The United States of America as represented by the Secretary of the Navy, Newport, RI (US)

(72) Inventors: John A Smith, Norfolk, VA (US); Alan J Davis, Wakefield, RI (US); Charles M Traweek, Saint Leonard, MD (US); Anthony Ruffa, Hope Valley, RI (US)

(73) Assignee: The United States of America as represented by the Secretary of the Navy

( * ) Notice: Subject to any disclaimer, the term of this patent is extended or adjusted under 35 U.S.C. 154(b) by 578 days.

(21) Appl. No.: 18/230,347

(22) Filed: Aug. 4, 2023

(65) Prior Publication Data

US 2024/0045067 A1 Feb. 8, 2024

Related U.S. Application Data

(60) Provisional application No. 63/395,353, filed on Aug. 5, 2022.

(51) Int. Cl.
| | |
|---|---|
| *G01S 17/00* | (2020.01) |
| *G01S 7/481* | (2006.01) |
| *G01S 7/487* | (2006.01) |
| *G01S 17/89* | (2020.01) |

(52) U.S. Cl.
CPC ............ *G01S 17/89* (2013.01); *G01S 7/4816* (2013.01); *G01S 7/4876* (2013.01)

(58) Field of Classification Search
CPC ...... G01S 17/89; G01S 7/4816; G01S 7/4876; G01J 3/4412

USPC ........................................................ 356/5.01
See application file for complete search history.

(56) References Cited

U.S. PATENT DOCUMENTS

| | | | | |
|---|---|---|---|---|
| 4,986,656 | A * | 1/1991 | Sweeney | G01N 21/53 356/73 |
| 7,773,229 | B2 | 8/2010 | Harlander | |
| 8,355,120 | B2 | 1/2013 | Englert | |
| 11,422,029 | B1 * | 8/2022 | Shao | G01J 3/10 |
| 2010/0165327 | A1 * | 7/2010 | Hartog | G01K 11/32 356/73.1 |
| 2013/0314694 | A1 * | 11/2013 | Tchoryk, Jr. | G01S 17/58 356/28.5 |

FOREIGN PATENT DOCUMENTS

CN        111157116 A  *  5/2020  ............. G01S 17/88

* cited by examiner

*Primary Examiner* — Helal A Algahaim
*Assistant Examiner* — James W. Napier
(74) *Attorney, Agent, or Firm* — James M. Kasischke; Jeffry C. Severson

(57) ABSTRACT

An apparatus for obtaining oceanographic information includes a controllable coherent light source providing light to an aquatic region. A telescope receives backscattered light that is filtered by an ambient light filter. A first interferometer receives filtered, backscattered light and provides a particulate backscatter output and a Brillouin backscatter output. A second interferometer accepts the Brillouin backscattered light and spatially disperses it according to frequency into a fringe pattern. An image sensor receives the fringe pattern. A processor joined to the image sensor utilizes image sensor output properties to determine oceanographic information concerning the aquatic region.

16 Claims, 9 Drawing Sheets

OCEAN SOUND SPEED PROFILING LIDAR

CROSS-REFERENCE TO RELATED APPLICATIONS

The present application claims the benefit of the U.S. Provisional Application Ser. No. 63/395,353 filed on Aug. 5, 2022 by the inventors herein, the complete disclosure of which is incorporated herein by reference in its entirety.

STATEMENT OF GOVERNMENT INTEREST

The invention described herein was made in the performance of official duties by employees of the U.S. Department of the Navy and the National Aeronautics and Space Administration and may be manufactured, used, or licensed by or for the Government of the United States for any governmental purpose without payment of any royalties thereon.

BACKGROUND OF THE INVENTION

1) Field of the Invention

The present invention is directed to systems and methods for the remote sensing of profiles of temperature, salinity, and sound speed through a body of water using lidar.

2) Description of the Prior Art

Lidar (light detection and ranging) is a remote sensing method in which light emitted by a transmitter is directed towards a target and the scatter from that target is collected and analyzed by a receiver to infer the properties of the target and/or of the intervening medium. If the transmitter is a pulsed, narrowband laser and the scattering target is a volume within a body of water, the depth and physical properties (e.g., temperature and salinity) of the water volume can be determined by resolving the time-of-flight and spectral properties of the light scattered and received from the volume.

Brillouin scattering involves the interaction of light with a medium whose index of refraction is altered because of organized density perturbations caused by acoustic or vibrational waves. The light is inelastically scattered by these waves, leading to frequency shifts and modulations imparted on the backscatter that reveal the acoustic velocity and viscosity within the scattering medium. If the medium is seawater, measurements of acoustic velocity and viscosity can be used to infer the local temperature and salinity, from which sound speed can be retrieved using a set of known relations. If the illumination is by pulsed laser, the timing of the backscatter relative to the emission of the laser pulse adds depth (and pressure) information. Depth and sound speed information can be combined to assemble a profile of sound speed through the water column.

A lidar that resolves the Brillouin (Brillouin-Mandelstam) spectrum of the scattered light is referred to as a "Brillouin lidar." Brillouin lidars are known in the art and have been proposed for seawater temperature measurement. Brillouin lidars must employ a spectrometer or spectral filter to optically resolve features of the Brillouin spectrum. Examples of spectrometers and filters used in Brillouin lidar are, e.g., Fabry-Perot interferometers (FPI), virtually imaged phased arrays (VIPA), atomic vapor filters (AVF) or molecular vapor filters (MVF), or combinations thereof.

The Doppler Asymmetric Spatial Heterodyne (DASH) technique is also known for lidar interferometry. DASH interferometers are known in the art and taught in U.S. Pat. No. 7,773,229, "Doppler Asymmetric Spatial Heterodyne Spectroscopy," to Harlander et al. DASH interferometers, in contrast with the FPI and VIPA, can be field widened (or "field compensated"). A wide field is critical to enhancing the collection of multiple scatter from depths in seawater. In contrast with AVF/MVF approaches, an interferometer implementing the DASH technique can be designed for a wide range of wavelengths, relaxing constraints on the laser transmitter and allowing for wavelengths that more efficiently penetrate a water body. The DASH technique images the entire lidar interferogram simultaneously in a single exposure by using an array of detectors or pixels, avoiding the need for scanning. U.S. Pat. No. 8,355,120 for "Doppler Asymmetric Spatial Heterodyne Spectroscopy Light Detection and Ranging Receiver" to Englert et al. utilizes a DASH spectrometer for measuring wind speed. Wind speed is measured by measuring the spectra of backscatter from air and comparing it to the transmitted frequency, inferring Doppler shift and line of sight wind speed from the centroid differences between the two.

A long term goal of the underwater sensing community has been objective and precise knowledge of the effects of the highly variable upper portion of the ocean water column upon acoustic propagation and the implications for searching effectively for undersea vehicles while knowing objectively the possibility of sounds from these vehicles traveling underwater. As such, there remains a need for apparatus and methods of rapid and precise measurement of sound speed in the ocean. Knowledge of temperature and/or salinity in the upper portion of the ocean water column would also inform or facilitate weather (esp. hurricane) forecasting, weather modeling, weather avoidance navigation, oceanic and atmospheric research.

SUMMARY OF THE INVENTION

The present invention discloses the apparatus, methods, and underlying mathematics in a series of intermingled steps to obtain the sound speed profile in the ocean using Brillouin lidar implemented with the DASH technique.

Accordingly, an apparatus for obtaining oceanographic information includes a controllable coherent light source providing light to an aquatic region. A telescope receives backscattered light that is filtered by an ambient light filter. A first interferometer receives filtered, backscattered light and provides a particulate backscatter output and a Brillouin backscatter output. A second interferometer accepts the Brillouin backscattered light and transforms it into a fringe pattern. An image sensor receives the fringe pattern. A processor joined to the image sensor utilizes image sensor output properties to determine oceanographic information concerning the aquatic region.

According to another embodiment, a method of obtaining oceanographic information from an aquatic region includes the steps of illuminating the aquatic region using a controllable laser. A backscattered light return signal is collected from the illuminated aquatic region. Ambient light is filtered out of the backscattered light return signal to produce a filtered return signal. The filtered return signal is separated into a particulate backscatter component and a Brillouin backscatter component. The Brillouin backscatter component is spatially dispersed into a fringe pattern, and the fringe pattern is captured using an image sensor. The image captured by the image sensor can be analyzed to produce oceanographic information such as temperature, salinity, and sound speed.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
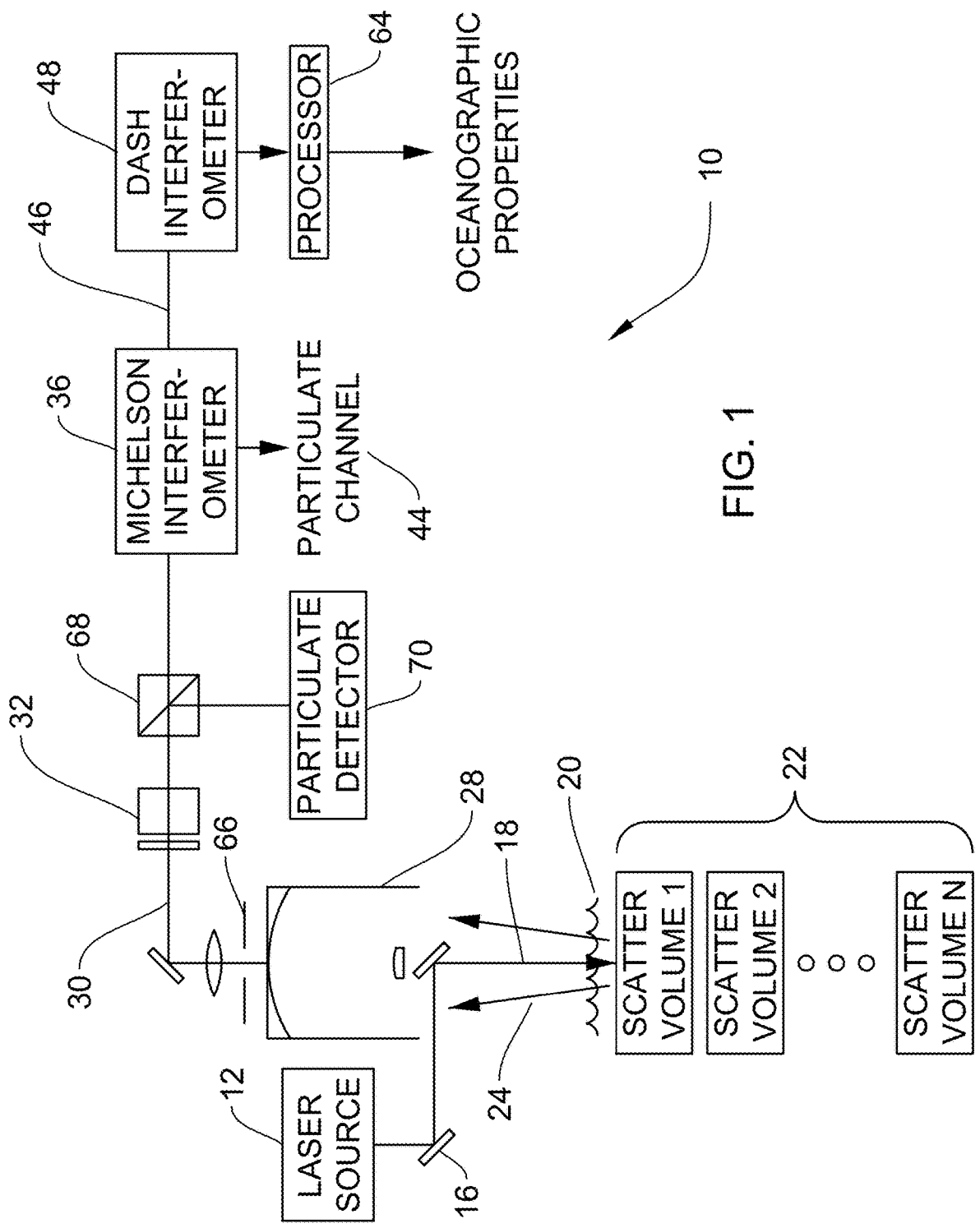
FIG. 1 is a block diagram showing an overview of the present invention.

FIG. 1 shows one embodiment of an apparatus 10 for ocean sound speed profiling. This embodiment utilizes a laser source 12 to provide a laser pulse 18. Laser source 12 can have the appropriate frequency for penetration through a volume of water. Laser source 12 can be pulsed by means known in the art. Laser source 12 can use a seed or master laser and pulsed laser combination. One or more mirrors 16 may be used to direct the laser pulse 18 into a body of water of interest, indicated as 20. Light is reflected from a plurality of predetermined scatter volumes 22 in the body of water 20. The backscattered light 24 is received by a telescope 28 or other optical instrument. The pulsed laser 14 is provided to allow imaging of different depths in the body of water 20 by the time of flight technique. Backscattered light 24 is reflected from the scatter volumes 22 that can extend as deep as backscattered light will return from the body of water 20. FIG. 1 shows different imaging areas as scatter volume 1; scatter volume 2; through scatter volume N. Generally, the scatter volumes 22 are separated from the surface by about 5 meters to avoid surface effects. The vertical extent of the scatter volumes 22 is governed by the pulse length of the pulsed laser 14.

Brillouin scattering involves the interaction of the laser light with the seawater whose index of refraction is altered as a result of density perturbations caused by acoustic or vibrational waves. The light is inelastically scattered by these waves, leading to frequency shifts imparted on the backscatter that reveal the acoustic velocity and viscosity within the seawater. Brillouin scattering is caused by Doppler frequency shifts in the scatter volume. That is, a portion of the scatter volume is moving towards the telescope 28, which results in a blue or higher frequency shift of the backscattered laser light. Another portion of the scatter volume is moving away from the telescope 28, which results in a red or lower frequency shift of the backscattered light. As a result, the Brillouin scattering will be at frequencies above and below the frequency of the laser pulse 18.

Figure 2:
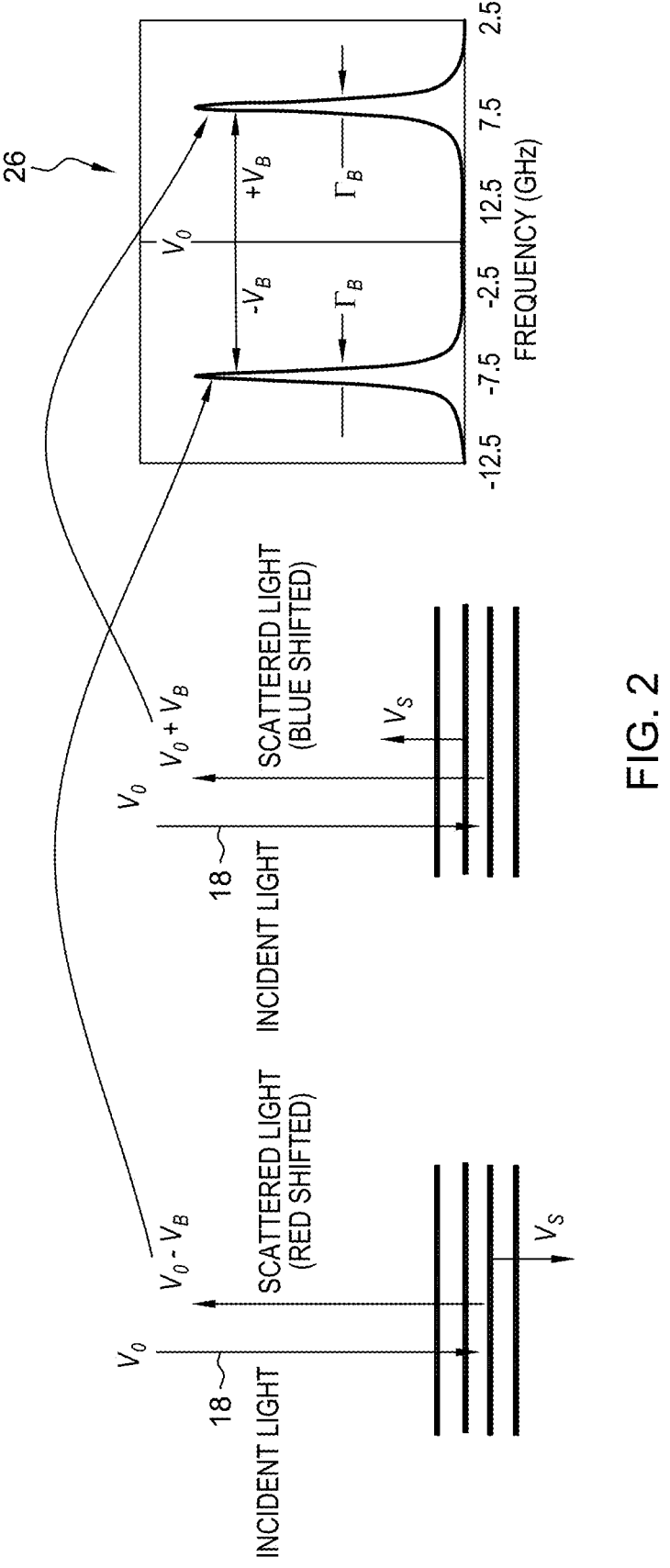
FIG. 2 is an illustration of the Brillouin backscatter process.

Referring to FIG. 2, the laser pulse 18 has a known frequency ($v_0$), which frequency is selected for penetration through a volume of water. The density perturbations in the seawater moving at sound speed ($V_s$) scatter the laser light, imparting a Brillouin shift ($v_B$). The sidebands in the backscattered spectrum are referred to as the Brillouin doublet, indicated generally as 26. The density perturbations have a finite lifetime on the order of nanoseconds because of dampening due viscosity. Such finite lifetime imparts a Brillouin linewidth ($\Gamma_B$) measured at half of the maximum power of the peak.

The Brillouin shift can be calculated as a function of sound speed, wavelength, and scattering angle:

$$v_B = \frac{2n}{\lambda} V_s \sin\left(\frac{\theta}{2}\right), \tag{1}$$

where n is the index of refraction in the medium,
λ is the wavelength of the laser,
$V_s$ is the sound speed, and
θ is the scattering angle (0 radians is forward scatter, π radians is backscatter).

Note that measuring the Brillouin shift alone is not enough to determine sound speed ($V_s$) because the index of refraction (n) is also temperature and salinity dependent. Therefore, the Brillouin linewidth must also be measured.

The Brillouin linewidth is a function of the bulk viscosity, shear viscosity, density, thermal properties, and wavenumber, as follows:

$$\Gamma_B = \frac{1}{2\pi}\frac{1}{\rho}\left(\frac{4}{3}\eta_s + \eta_B + \kappa\left(\frac{1}{c_v} - \frac{1}{c_p}\right)\right)k^2, \tag{2}$$

where ρ is the density of seawater,
$\eta_s$ is the sheer viscosity,
$\eta_B$ is the bulk viscosity,
K is the thermal conductivity,
$c_v$ is the specific heat at constant volume, and
$c_p$ is the specific heat at constant pressure.
In equation (2), the term $$\kappa\left(\frac{1}{c_v} - \frac{1}{c_p}\right)$$

is significantly smaller than the term $$\frac{4}{3}\eta_s + \eta_B$$

for water bodies. The wavenumber k is:

$$k = \frac{4\pi}{\lambda}n\sin\left(\frac{\theta}{2}\right). \tag{3}$$

The effect of variations in temperature and salinity on the Brillouin spectrum is reasonably well understood and tables relating the Brillouin spectrum to temperature and salinity are readily available. Measurement of the Brillouin spectra revealing temperature and salinity allows retrieval of sound speed in the volume of interest.

Referring again to FIG. 1, light is received by the telescope 28 and the light return signal 30 is directed from the telescope 28 to a narrow passband filter 32. Filter 32 is an interference type optical band pass filter having an ultra-narrow pass band, which filters out unwanted external light such as ambient solar light from the light return signal 30. It is desirable to maximize the peak transmission while minimizing the out of band transmissions. Filter 32 can be a solar etalon, a thin film interference filter, or other filtering means including interferometric filters. The narrow pass-band filter 32 passes light related to backscatter and filters out light from other sources. Filter 32 produces several peaks.

Figure 3:
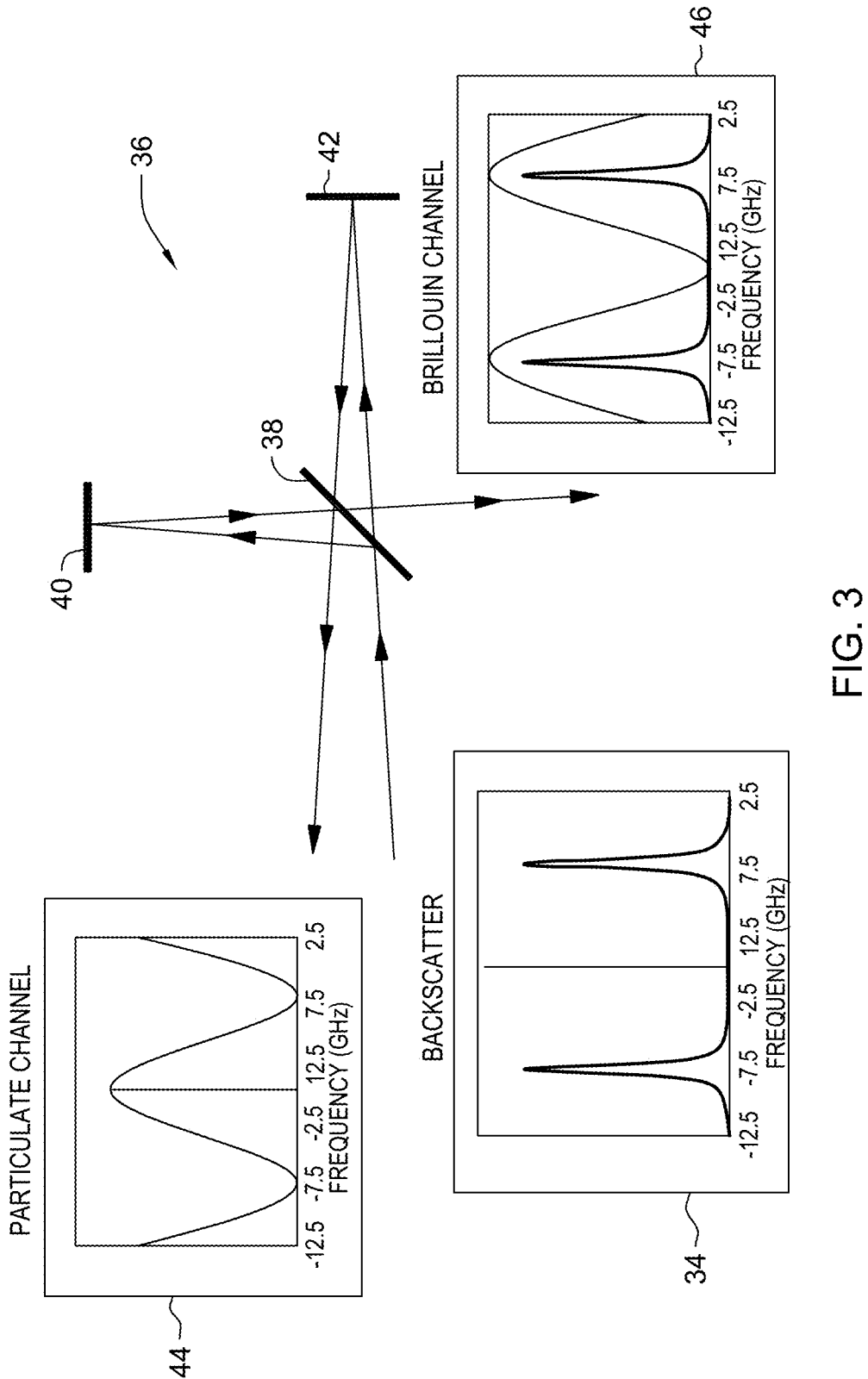
FIG. 3 shows the optical paths in an exemplary Michelson interferometer.

The filtered light return signal 34, also called backscatter, from the filter 32 is provided to a first interferometer 36. The first interferometer 36 can be a Michelson interferometer. The Michelson interferometer 36 uses a path length difference between legs of the interferometer to separate particulate backscatter from backscatter related to Brillouin backscattering. The particulate backscatter can be separated out from the filtered light return signal 34 using the Michelson interferometer 36 because the particulate backscatter will be at essentially the same frequency as the laser pulse 18. Referring to FIG. 3, the Michelson interferometer 36 includes a first beam splitter 38 and mirrors 40, 42. The Michelson interferometer 36 has an optical path difference of approximately 2 centimeters. The output of the Michelson interferometer 36 is a particulate channel 44 and a Brillouin channel 46. An appropriately tuned Michelson interferometer directs most of the laser line backscatter to the particulate channel 44, suppressing it from the Brillouin channel 46.

In an alternative embodiment, interferometer 36 could be a filter attenuating the laser line backscatter and passing the Brillouin backscatter. With this alternative, particulate channel 44 backscatter will be attenuated and not collected.

The portion of the filtered light return signal that is related to Brillouin backscattering, i.e., the Brillouin channel 46, is passed to a second interferometer 48. The second interferometer 48 is a Doppler Asymmetric Spatial Heterodyne (DASH) interferometer.

Figure 4:
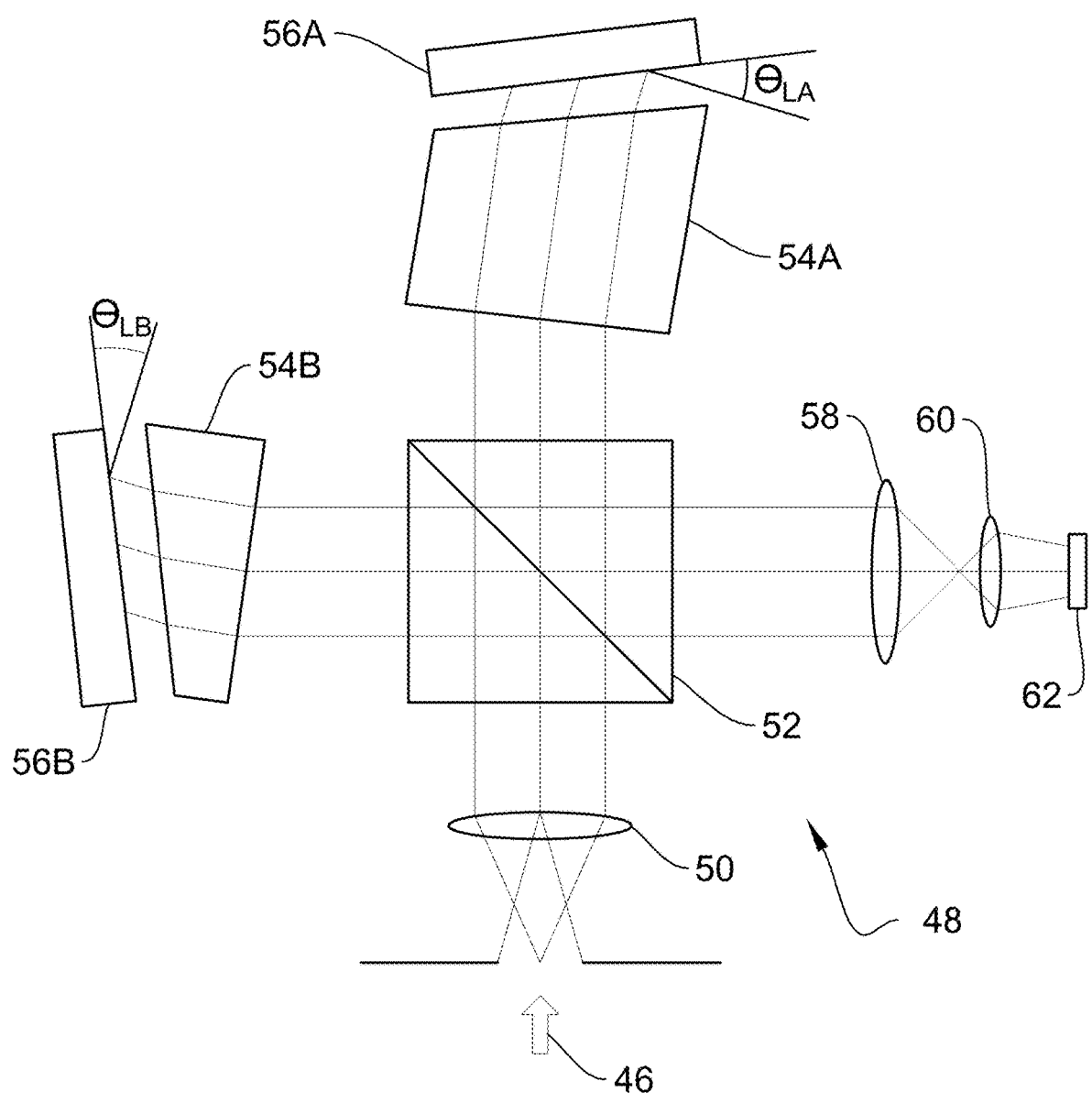
FIG. 4 shows the optical paths in an exemplary DASH interferometer.

The DASH interferometer 48 produces an interferogram containing the spectral information. Referring to FIG. 4, the Brillouin channel 46 of backscatter enters the DASH interferometer 48. Input lens 50 collimates the scatter. Unlike a Michelson interferometer, DASH interferometer 48 utilizes a pair of fixed diffraction gratings 56A, 56B tilted at angles $\theta_{LA}$ and $\theta_{LB}$ at or near Littrow and prisms 54A and 54B. Gratings 56A and 56B in Littrow configuration allow the DASH interferometer 48 to obtain the pertinent spectral information in a single exposure, avoiding the need for scanning. The output of the beam splitter 52 is imaged onto an array detector 62 by exit optics 58 and 60. The processor 64 analyzes the interferograms from detector 62 to determine sound speed in the scatter volumes 22, as described in more detail below.

Referring again to FIG. 1, each scatter volumes 22 is imaged as the laser pulse 18 travels successively through the scatter volumes 22 and backscattered light 24 is received by the telescope 28. A field stop 66 limits the field of regard while efficiently passing the return signal 30. Different scatter volumes 22 can be distinguished by the two-way time of flight of the laser pulse 18. The filtered backscatter 34 can be analyzed to determine sound velocity in each scatter volume 22.

Interferograms associated with each scatter volume 22 may be imaged sequentially or simultaneously. In one embodiment, detector 62 is a gated, intensified CMOS or CCD camera that acquires the interferograms sequentially. Each scatter volume of interest is interrogated individually by appropriately varying the duration and delay of the camera's gate relative to the emission of the laser pulse. In a second embodiment, detector 62 is a sensor array having a plurality of single photon sensitive elements (e.g., single photon avalanche diodes or Geiger-mode avalanche photo-diodes). These elements are capable of approximately nano-second photon timing and can acquire interferograms from all scatter volumes 22 simultaneously. For either embodiment, each frame or exposure may contain an accumulation of scatter from multiple laser pulses, and the number of photosensitive elements must be sufficient to capture the pertinent spatial frequencies.

Figure 5A:
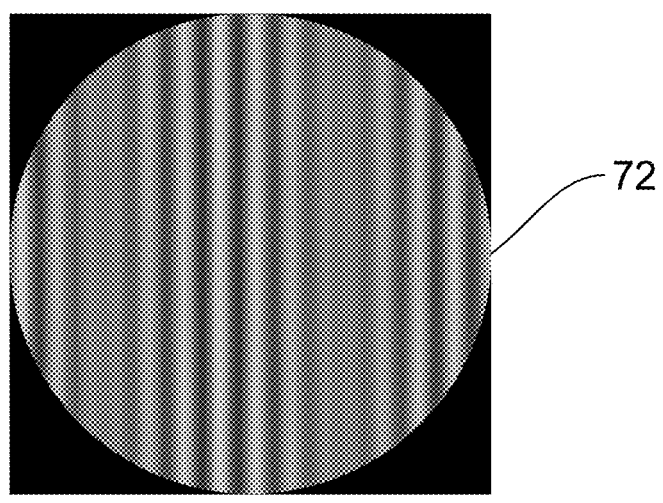
FIGS. 5A and 5B show an interferogram image and cross-section obtained from the DASH interferometer.
Figure 5B:
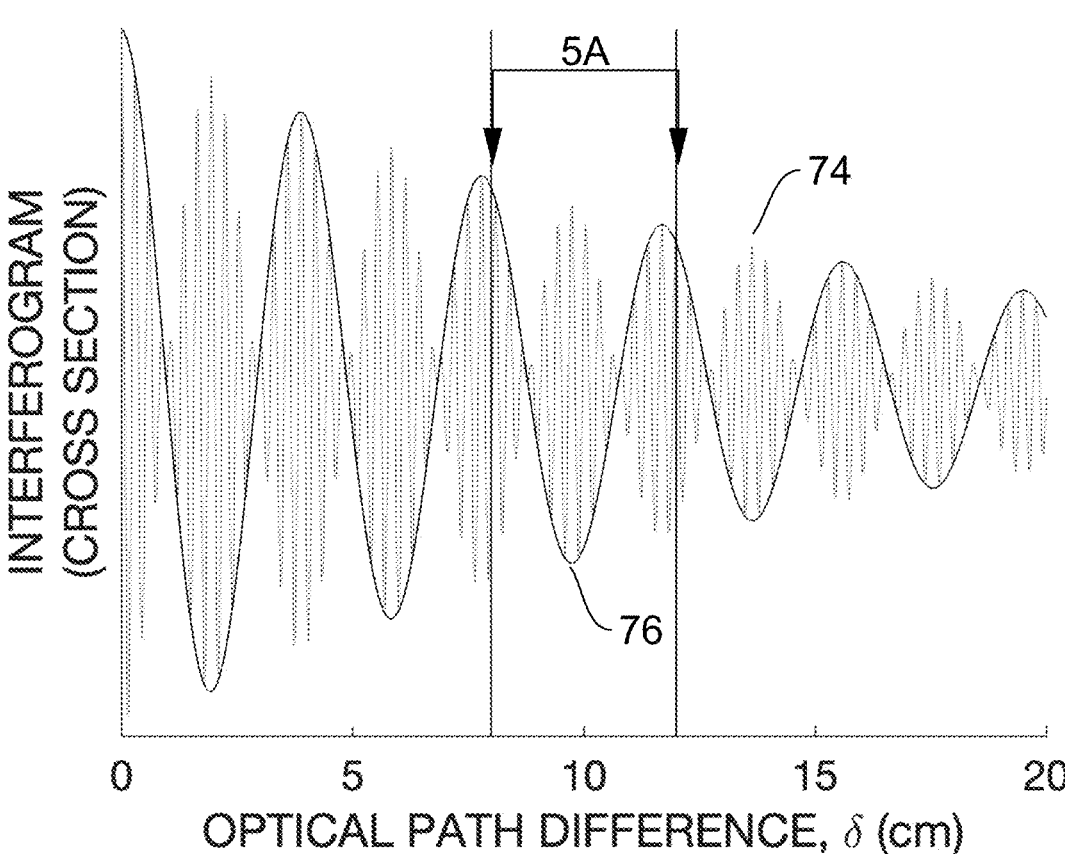

FIG. 5A shows a representation of an interferogram image 72 captured by the array detector 62. An offset optical path difference of 10 cm with a range of +/−2 cm is illuminated in this example. A cross section of FIG. 5A is shown in FIG. 5B. The FIG. 5A portion is indicated by arrows 5A. In response to the Brillouin doublet there is a Littrow hetero-dyne spatial frequency 76 modulated in amplitude by a cosine "envelope" 78 that decays in amplitude as the optical path difference increases. At non-zero optical path differences, the phase and amplitude of the cosine envelope are sensitive to the Brillouin doublet's shift and linewidth, respectively. The underlying mathematics are illustrated in a series of steps.

The cross-sections of the background subtracted interferogram is modeled as follows (4):

$$I(x) = \tag{4}$$
$$E_0 \eta \frac{a}{2} \left( 1 + M \exp\left(-\pi \Gamma_B \delta(x)/c\right) \cos\left(2\pi \nu_B \delta(x)/c\right) \cos\left(2\pi(\nu_L - \nu_0)\delta(x)/c\right) \right)$$

Where:
δ(x) is the optical path difference, equal to $4 \times \tan(\theta_L) + 2\Delta d$;

η is the detection efficiency of the array detector;

a, M are the interferometer's defect coefficients;

$E_0$ is the incident scattered photon number per pixel;

$\Gamma_B$ is the Brillouin linewidth;

$\nu_B$ is the Brillouin shift;

c is the speed of light in vacuum;

$\nu_L$ is the Littrow frequency;

$\nu_0$ is the transmitting laser's frequency;

$\theta_L$ is the grating angle $\theta_{LA}$, $\theta_{LB}$;

x is distance along the illuminated grating area; and

Δd is the interferometer's offset optical path difference.

Position x maps to a position along the array detector. The fringe visibility factor M and the Littrow heterodyne frequency ($\nu_L - \nu_0$) are assessed episodically using a narrow-band source, e.g., scatter from the water surface or injected light from the transmitter. The factor $$E_0 \eta \frac{a}{2}$$

is obtained by averaging over the Littrow heterodyne. The following "normalized interferogram" is then obtained for each scatter volume (5).

$$Q = \tag{5}$$

$$\frac{1}{M}\left(\frac{I(x)}{E_0\eta\frac{a}{2}} - 1\right) = \exp\left(-\pi\Gamma_B\delta(x)/c\right)\cos\left(2\pi\nu_B\delta(x)/c\right)\cos\left(2\pi(\nu_L - \nu_0)\delta(x)/c\right)$$

The first two factors right of the equal sign, which are the envelope of the Littrow heterodyne, are sensitive to the Brillouin linewidth and Brillouin shift, respectively.

If residual elastic scatter is present, (5) is modified as follows:

$$Q \cong \tag{6}$$

$$\left(\frac{1}{\gamma+1}\exp\left(-\pi\Gamma_B\delta(x)/c\right)\cos\left(2\pi\nu_B\delta(x)/c\right) + \frac{\gamma}{\gamma+1}\right)\cos\left(2\pi(\nu_L - \nu_0)\delta(x)/c\right)$$

where $\gamma$ is the ratio of the amount of elastic scatter to the amount of Brillouin scatter at the input aperture 23. The envelope is recovered using model fits or spectral analysis methods and the Brillouin shift, Brillouin linewidth and residual elastic scatter ratio are then derived from the phase, amplitude and offset of the envelope.

Figure 6A:
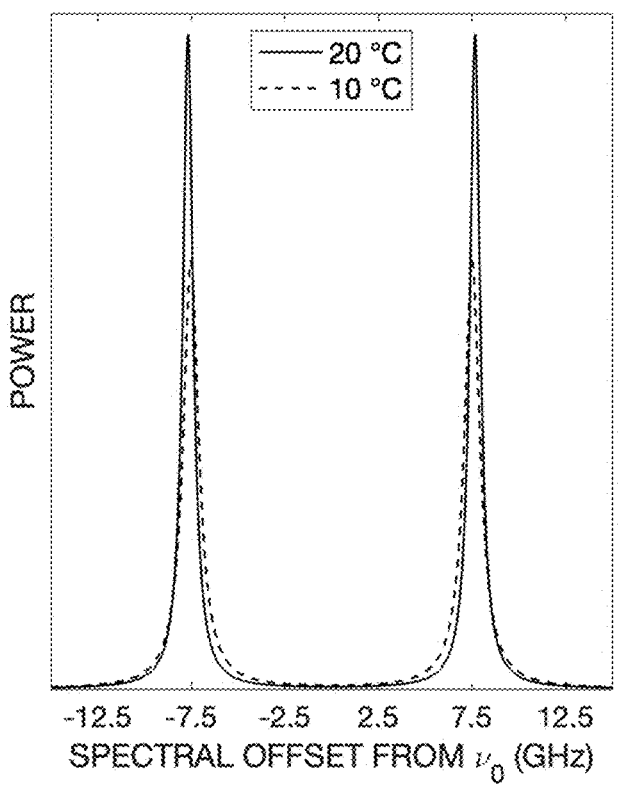
FIGS. 6A and 6B show Brillouin shift by temperature changes in water with a spectrum, FIG. 6A, and a cross-section, FIG. 6B.
Figure 6B:
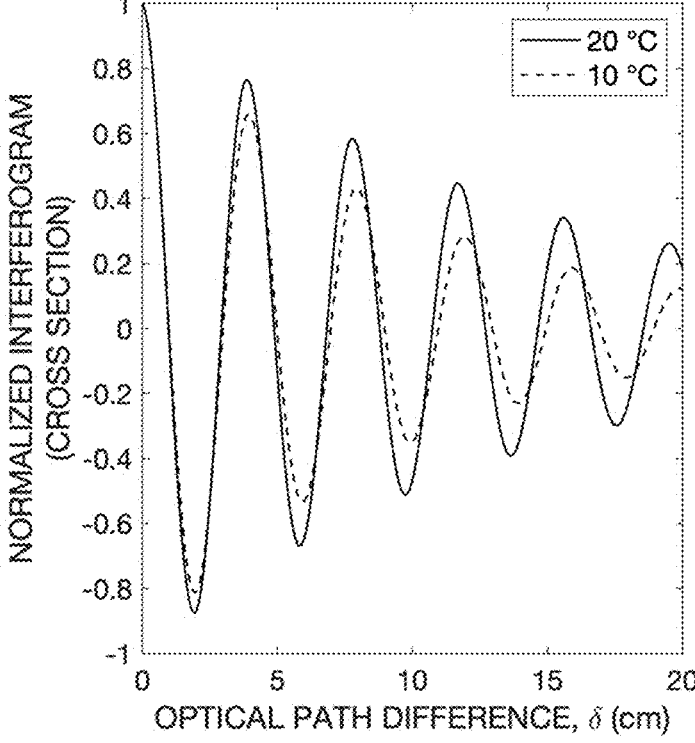
Figure 7:
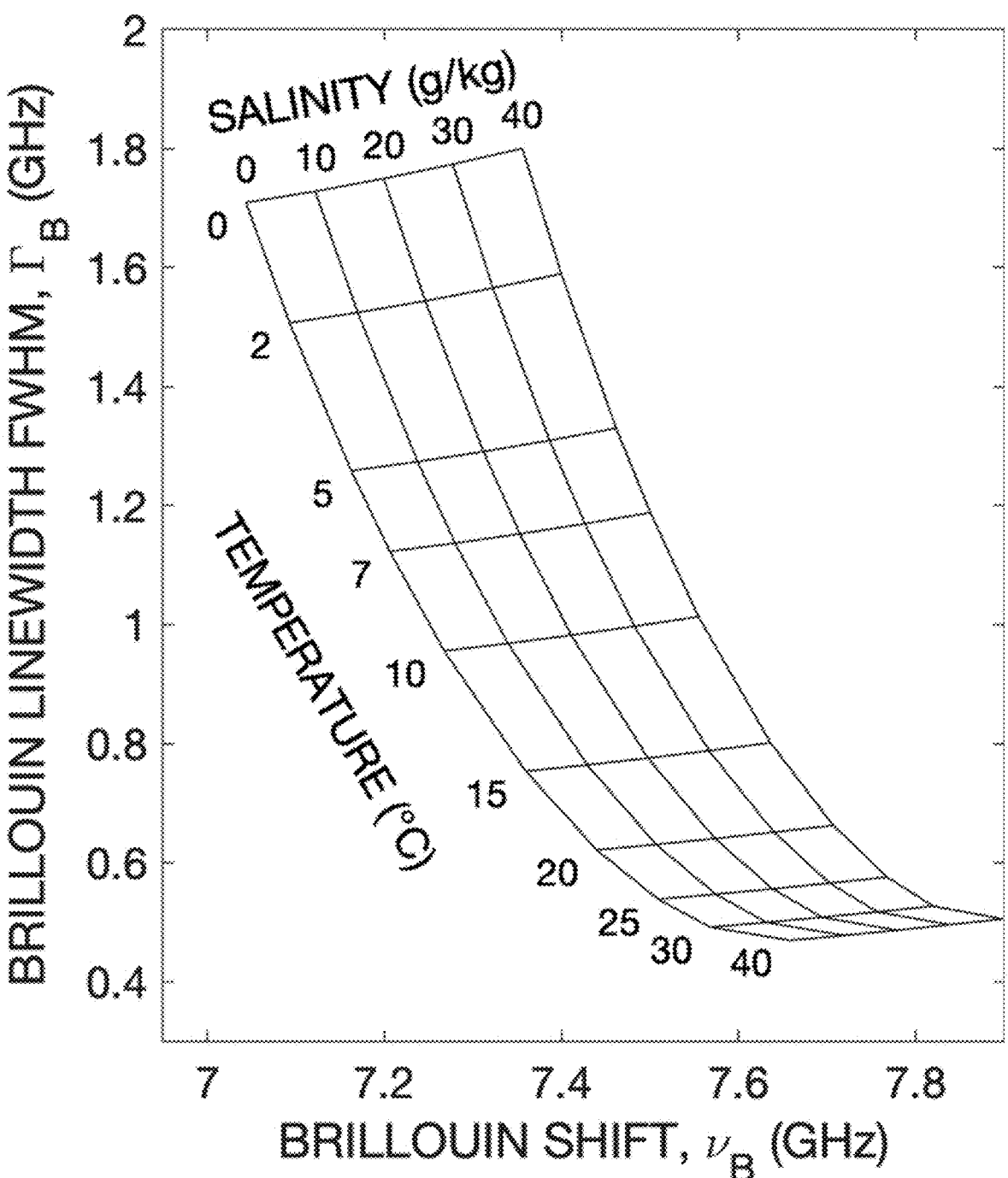
FIG. 7 provides a prior art conversion chart for obtaining salinity and temperature from Brillouin parameters.

Referring to FIGS. 6A and 6B, the phase and amplitude of the envelope at a non-zero optical path difference are sensitive to the Brillouin shift and Brillouin linewidth, respectively. FIG. 6A shows the Brillouin spectrum at two different water temperatures. FIG. 6B shows a cross-section of one peak of the Brillouin spectrum at two different water temperatures. In FIG. 6B, Littrow heterodyne fringes are omitted for clarity. Brillouin shift and Brillouin linewidth are converted to water temperature and salinity as known in the art and shown in FIG. 7. Sound speed is derived from temperature and salinity using a known formula.

Figure 8:
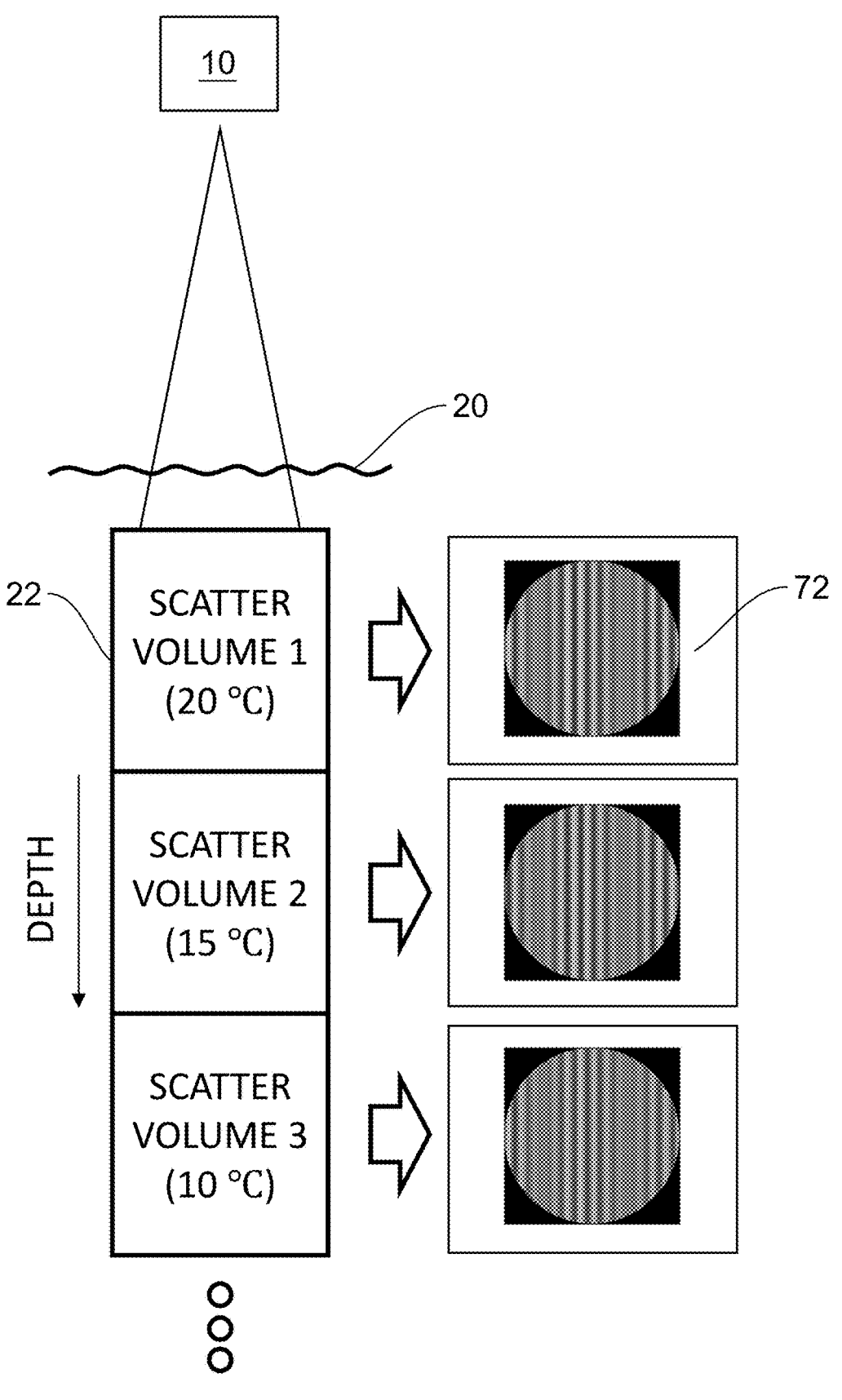
FIG. 8 illustrates a DASH interferogram cross-section for different scatter volumes.
Figure 9:
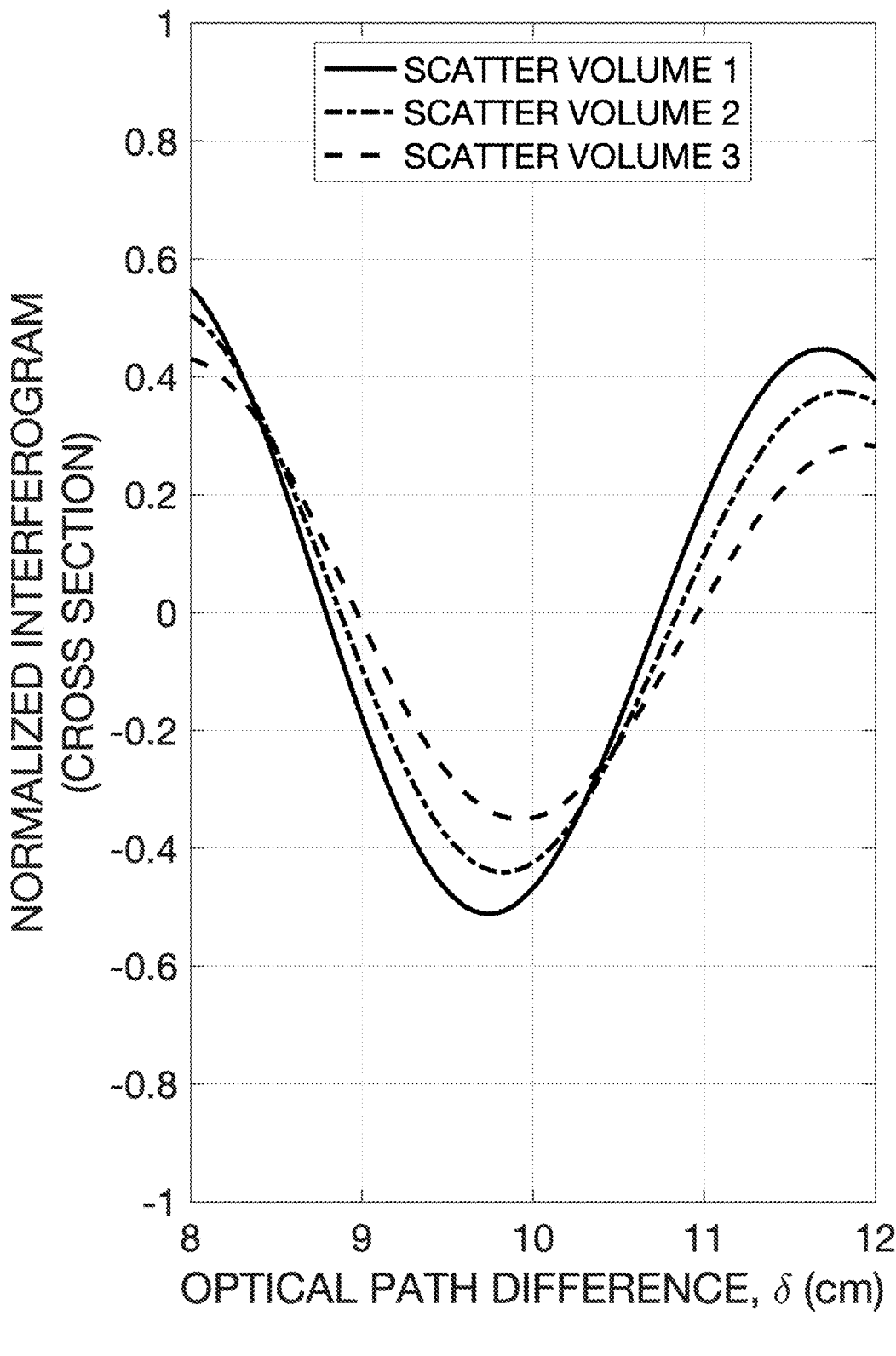
FIG. 9 shows optical path differences and cross-section envelopes for different scatter volumes.

FIG. 8 illustrates the process applied to acquiring sound speed profiles from device 10 above the surface 20. Each image is a snapshot 72 of the interferograms from a scatter volume corresponding to a particular depth. As shown above, this interferogram can be utilized to calculate temperature, salinity, and sound speed. FIG. 9 shows a normalized interferogram cross-section of the optical path differences for different scatter volumes. As before, Littrow heterodyne fringes are omitted for clarity.

One of the advantages of the present invention is that it can be designed for any wavelength that transmits water, and is photon efficient. It does not require assumptions about temperature or salinity of the water environment to derive the sound speed. The interferometers employed herein can be adjusted for higher light throughput and can be fully thermally compensated. The Linear fringes are compatible with the rectilinear array readout. The optics, with no scanning/moving parts, are rugged, suitable for launch and airborne environments.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for obtaining oceanographic information from an aquatic region comprising: a processor; a controllable coherent light source connected to said processor wherein said processor controls output of coherent light to the aquatic region;

a telescope capable of receiving backscattered light from the aquatic region; an ambient light filter connected to said telescope for attenuating ambient light from the backscattered light and allowing passage of filtered backscattered light;

a first interferometer, comprising a Michelson interferometer, joined to said ambient light filter for receiving filtered backscattered light and having a particulate backscatter output and a Brillouin backscatter output; a second interferometer, comprising a Doppler asymmetric spatial heterodyne interferometer, connected to said first interferometer Brillouin backscatter output, said second interferometer being capable of spatially dispersing the Brillouin backscattered light by frequency into a fringe pattern; and an image sensor connected to the second interferometer to receive the fringe pattern, said image sensor being further connected to said processor whereby said processor utilizes image sensor output properties to determine oceanographic information concerning the aquatic region.

2. The apparatus according to claim 1 wherein: said image sensor receives the fringe pattern with different corresponding time delays related to different aquatic regions having different depths; and said processor utilizes image properties with different recorded time delays to determine oceanographic information at aquatic regions having different depths.

3. The apparatus according to claim 2 wherein the oceanographic information is water temperature and salinity in the aquatic region.

4. The apparatus according to claim 2 wherein the oceanographic information is sound speed in the aquatic region.

5. The apparatus according to claim 1 wherein said Michelson interferometer has an optical path difference of approximately 2 centimeters.

6. The apparatus according to claim 1 wherein said Doppler asymmetric spatial heterodyne interferometer has two optical paths and has a fixed, tilted diffraction grating at the end of each optical path.

7. The apparatus according to claim 6 wherein the Doppler asymmetric spatial diffraction gratings enable said image sensor to image the entire output of said Doppler asymmetric spatial heterodyne interferometer simultaneously in a single exposure.

8. The apparatus according to claim 1 wherein said controllable coherent light source comprises: a seed laser; and a pulsed laser joined to receive light from said seed laser and capable of producing pulsed, narrowband light aligned closely with that of said seed laser before harmonic conversion.

9. The apparatus according to claim 8 further comprising a field stop joined to said telescope and to said ambient light filter to receive backscattered light from said telescope and to provide light to said ambient light filter.

10. The apparatus according to claim 1 further comprising a particulate detector joined to said telescope that utilizes backscattered light to measure the amount of backscatter attributable to particulate.

11. A method of obtaining oceanographic information from an aquatic region comprising: illuminating the aquatic region using a controllable laser;

collecting backscattered light return signal from the illuminated aquatic region;

filtering out ambient light from the backscattered light return signal to produce a filtered return signal; separating the filtered return signal into a particulate backscatter component and a Brillouin backscatter component, using a Michelson interferometer;

spatially dispersing the Brillouin backscatter component into a fringe pattern, using a Doppler asymmetric spatial heterodyne interferometer; capturing the fringe pattern using an image sensor; and analyzing the fringe pattern to obtain the oceanographic information.

12. The method of claim 11 wherein the oceanographic information is water temperature and salinity in the aquatic region.

13. The method of claim 11 wherein the oceanographic information is sound speed in the aquatic region.

14. The method according to claim 13 wherein the step of analyzing comprises measuring a spectral separation of the Brillouin doublet wherein the spectral shift and linewidth of the Brillouin doublet relate to temperature and salinity in the aquatic region.

15. The method of claim 11 wherein: said step of illuminating the aquatic region is performed over controlled time intervals; and further comprising the steps of: time gating the collected backscattered light return signal; correlating the obtained oceanographic information with the controlled time intervals and the time gated collected backscattered light return signal to obtain oceanographic information concerning different depths in the aquatic region.

16. The method according to claim 11 further comprising measuring particulate utilizing the particulate backscatter component of the filtered return signal.

* * * * *